United States Patent [19]

Lewis

[11] Patent Number: 4,536,486
[45] Date of Patent: Aug. 20, 1985

[54] PROCESS FOR DEWAXING WITH MORDENITE

[75] Inventor: Paul H. Lewis, Groves, Tex.

[73] Assignee: Texaco Inc., White Plains, N.Y.

[21] Appl. No.: 480,640

[22] Filed: Mar. 31, 1983

[51] Int. Cl.³ .............................................. B01J 29/22
[52] U.S. Cl. ...................................... 502/74; 502/78; 208/111; 208/120
[58] Field of Search .................... 502/74, 78; 208/111, 208/120

[56] References Cited

U.S. PATENT DOCUMENTS

| | | | |
|---|---|---|---|
| 3,480,539 | 11/1969 | Voorhies, Jr. et al. | 208/111 |
| 3,507,931 | 4/1970 | Morris et al. | 502/78 |
| 3,706,694 | 12/1972 | Young | 208/111 X |
| 3,775,298 | 11/1973 | Morris et al. | 208/111 |
| 3,833,499 | 9/1974 | Egan et al. | 208/111 |
| 4,151,120 | 4/1979 | Marcilly | 502/74 |
| 4,240,932 | 12/1980 | Alafandi et al. | 502/73 |
| 4,325,808 | 4/1982 | Kim et al. | 208/65 |
| 4,359,409 | 11/1982 | Otter | 502/78 |

Primary Examiner—D. E. Gantz
Assistant Examiner—O. Chaudhuri
Attorney, Agent, or Firm—Robert A. Kulason; Carl G. Seutter

[57] ABSTRACT

Catalytic dewaxing is effected with reduced coking by use of catalyst containing 0.5 w %-2.5 w % platinum-palladium group metal on hydrogen mordenite, the catalyst having been calcined at 1200° F.-1600° F. prior to use whereby it acquires activated sites (not present in mordenite products calcined at lower temperature) which are retained under anhydrous conditions.

11 Claims, No Drawings

PROCESS FOR DEWAXING WITH MORDENITE

FIELD OF THE INVENTION

This invention relates to hydrocarbon conversion. More specifically, it relates to the catalytic dewaxing of hydrocarbons.

BACKGROUND OF THE INVENTION

As is well known to those skilled in the art, hydrocarbon lubricating oil stocks may be dewaxed to form more desired products in the presence of various catalysts typified by mordenite catalysts. Illustrative of prior art showing mordenite catalysts and its use in hydrocarbon processing may be noted.

U.S. Pat. No. 3,507,931
U.S. Pat. No. 3,190,939
U.S. Pat. No. 3,539,498
U.S. Pat. No. 3,831,597
U.S. Pat. No. 3,925,503
Brit. Pat. No. 1,088,933 etc.

In prior art catalytic dewaxing processes using mordenite catalysts (typified by the processes of U.S. Pat. No. 3,539,498 and Brit. Pat. No. 1,088,933), the catalyst is calcined prior to use at temperature up to about 1000° F. Continuing operation with such catalysts is found to be limited by the conversion of charge into coke and lighter components typically hydrogen. Hydrogen and coke production represents loss of valuable charge; and production of coke particularly decreases the catalyst life and requires more frequent regeneration.

It is an object of this invention to provide a process for catalytic dewaxing. Other objects will be apparent to those skilled in the art.

STATEMENT OF THE INVENTION

In accordance with certain of its aspects, this invention is directed to a method of preparing a catalyst which comprises loading a hydrogen mordenite, having a silica-to-alumina mole ratio of 10-50:1, with a metal of the platinum-palladium group thereby forming a loaded hydrogen mordenite; calcining said loaded hydrogen mordenite at 1200° F.–1600° F. thereby forming a calcined loaded hydrogen mordenite containing activated sites; and recovering said calcined loaded hydrogen mordenite containing activated sites.

DESCRIPTION OF THE INVENTION

The charge composition which may be used in practice of the invention is a particular form of crystalline aluminosilicate known as mordenite. Although mordenite is naturally occurring in the sodium form, synthetic mordenites have become commercially available and are extremely useful in the process of this invention. In its sodium form, mordenite usually has minimal catalytic activity and must therefore be converted to the hydrogen or decationized form before it finds utility in catalytic processes.

Mordenite structures are characterized by parallel sorption channels of uniform cross-section. The sorption channels are parallel to the C-axis of the crystal and are elliptical in cross-section. The sorption channel dimensions of sodium mordenite, based on crystallographic studies, have been reported as having a minor diameter of 6.7A., a major diameter of 7.0A. and a free diameter of 6.6A.; the hydrogen form of mordenite is believed to have somewhat larger pore openings with a minor diameter of not less than about 6.7A. and a major diameter less than 8A.

Although mordenite occurs in nature, synthetic mordenites are commercially available from the Norton Company under the trade name Zeolon. These mordenites have a chemical composition on a unit cell basis of:

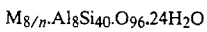

$$M_{8/n} \cdot Al_8 Si_{40} \cdot O_{96} \cdot 24H_2O$$

where M may be sodium, hydrogen or some other exchangeable cation and n is the valence of the cation. The high ratio of silica to alumina of 10:1 in the synthetic mordenite permits complete acid exchange to a stable hydrogen form and imparts excellent chemical and thermal stability. The effective working diameter of hydrogen mordenite (prepared by acid treating synthetic sodium mordenite) marketed under the trade name Zeolon H, appears to be in the range of 8 to 10A. as indicated by adsorption of aromatic hydrocarbons.

Structurally, mordenite is significantly distinguishable from other zeolites. Mordenite has a chain type zeolite structure in which a number of chains are linked together into a structural pattern with parallel sorption channels similar to a bundle of parallel tubes. In contrast Type A, Type X and Type Y synthetic zeolites and faujasite have three dimensional crystalline cage structures having 4 or 6 windows or pore openings per unit cell through which access may be had to the inner cavities of the zeolitic molecular sieve.

The sodium form of mordenite is not effective as a catalyst, regardless of whether the temperature is within the range unusually employed. However, the hydrogen form of synthetic mordenite, having a sodium content of less than 5 weight percent, is effective for catalytic dewaxing. Decationized mordenite may be produced by exchange of the sodium in the mordenite with ammonium ions followed by heating or calcining to drive off ammonia.

An extremely effective method of producing the decationized mordenite is by acid treatment. In addition to decationizing the mordenite, acid treatment may also remove some of the aluminum from the zeolitic structure, thereby increasing the relative proportions of silica to alumina in the zeolite. In its sodium form, both natural and synthetic mordenite have a mole ratio of silica to alumina of about 10 to 1. Hydrogen mordenite also has a silica to alumina mole ratio of about 10 to 1; but acid treating the sodium mordenite to produce the decationized form may remove aluminum sufficiently to increase the silica to alumina ratio slightly above 10 to 1.

The acid leaching used to produce the mordenite catalysts employed in the process of this invention must be severe enough to substantially increase the silica to alumina mole ratio of the mordenite to about above 10:1. However, the acid leaching must not be so severe as to destroy the crystalline structure of the mordenite. Further, little improvement has been observed in our dewaxing process where the silica to alumina ratio of the mordenite is greater than about 50:1.

Consequently, as a practical limit the acid leaching should be severe enough to produce a mordenite having a silica to alumina ratio between 10:1 and 50:1, preferably between about 10:1 and 20:1.

Acid leaching may be suitably effected with mineral acids which will selectively remove aluminum without destroying the zeolitic crystalling structure, for example, hydrochloric or sulfuric acid. Boiling dilute hydrochloric acid is extremely effective in removing the aluminum.

Although we have described an acid leaching technique for preparing the mordenite catalysts used in our process, hydrogen mordenites having silica to alumina mole ratio between about 10:1 and about 50:1 prepared by other methods may also be employed in our process.

The catalyst support so obtained is loaded with a metal of the platinum-palladium group—platinum, iridium, osmium, palladium, rhodium, or ruthenium. Preferred metals include platinum and palladium and more preferably palladium. A loading of 0.1 w %–10w %, say 2w % palladium may be employed.

Catalyst containing metal-on-hydrogen mordenite is obtained by immersing the catalyst support in preferably aqueous solutions containing soluble salts (such as palladium chloride) of the metals—preferably in several steps after each of which the loaded catalyst composition may be dried at 150° F.–250° F., preferably 180° F.–225° F., say 212° F. for 3–18 hours, preferably 3–10 hours, say 5 hours.

The metal is distributed substantially throughout the body of mordenite as 60–300 A crystals.

When the final catalyst composition is formulated, it may be dried at 150° F.–250° F., preferably 180° F;14 225° F., say 212° F. for 3–18 hours, preferably 3–10 hours, say 5 hours.

The advantages of the novel process are not attained unless calcination be carried out at 1200° F.–1600° F., preferably 1300° F.–1500° F., say 1300° F. for 10–24 hours, preferably 10–20 hours, say 15 hours.

Whether or not the hydrogen mordenite is prepared by exchange of NH$_4$+ for Na+ or by leaching with acid such as hydrochloric acid, prior art teaching indicates that the acid mordenite should not be calcined to temperature above about 1000° F. (e.g. 538° C.) because the sintering which occurs at the higher temperature is said to destroy the catalytic activity.

It is a feature of the process of this invention that the final catalyst composition must have been calcined at 1200° F.–1600° F., preferably 1300° F.–1500° F., say 1300° F. after contact with aqueous solutions and prior to use in catalytic dewaxing.

It is, for example, possible to carry out this high temperature calcination in the following manner:

(i) calcine the catalyst support, prior to loading with metal, at 1200° F.–1600° F., say 1300° F. for 5–24 hours, say 15 hours followed by calcination of the loaded at temperature of 1200° F.–1600° F. say 1300° F. for 5–24 hours, say 15 hours.

(ii) calcine the catalyst support prior to loading, with metal, at a temperature below 100° F.–1600° F., say typically 1000° F.–1200° F., sat 1000° F. for 5–24 hours, say 15 hours followed by calcination of the loaded support at 1200° F.–1600° F., say 1300° F. for 5–24 hours, say 15 hours.

Regardless of the technique used to prepare the final catalyst composition, the mordenite, will have been modified or activated. Specifically, it appears that the Bronsted acid sites which are substantially untouched at temperatures below about 1200° F. are converted, at temperatures above about 1200° F., to Lewis acid sites which are activated sites. It is these Lewis acid sites which are believed to serve as activated sites which permit dewaxing to be carried out in accordance with this invention. These activated sites (formed by calcining at 1200° F.–1600° F., preferably 1300° F.–1500° F., after loading and after the catalyst has been contacted with water for the last time) make it possible to effect catalytic dewaxing with conversion) which may approach 100%.

It may be noted that the hydrogen mordenite may be in the form of the NH$_4$+ mordenite which is converted to the hydrogen form on heating.

It is unexpectedly found that calcining the mordenite catalysts of this invention under the noted conditions desirably decreases coking when used in hydrocarbon conversion and it permits use of the catalyst for longer periods between regeneration.

It is a feature of this invention that this increased activity is found in acid mordenite having a silica to alumina ratio which is above about 10:1 (i.e. at 10:1 or greater). As the ratio increases to about 20:1, the maximum activity is observed (for 1300° F.–1500° F. calcination of loaded mordenite) and as the ratio increases to about 60:1, the activity drops to a level at which it is no longer desirable.

It appears that it is desirable to operate in the range of 10–50:1, more preferably 10–30:1; and generally a ratio of 20:1 may be preferred.

It may be noted, however, that the preferred ratio may vary depending on the desiderata. By way of illustration, it is possible by using a catalyst having a ratio of 10:1, calcined at 1480° F. after deposition of metal, to obtain 77% conversion. With use of a 20:1 mordenite, it is possible to attain 100% conversion by use of catalyst calcined at 1300° F.

A preferred catalyst to be employed in practice of the process of this invention may be a 2w% palladium-on-hydrogen mordenite (20:1 weight ratio of silica-to-alumina) which has been calcined at 1300° F. after being loaded with palladium.

The catalyst as used in dewaxing will not have been contacted with water after calcining, whereby the Lewis acid sites generated by calcination will be present during dewaxing. Furthermore, charge to dewaxing will be maintained substantially anhydrous (containing less than about 1w % water) to the end that dewaxing will be carried out at substantially anhydrous conditions). Generally, the catalyst, after calcination, will be subject to conditions which are conducive to keeping it anhydrous i.e. maintaining the water content below about 1w %, and typically 0.1w %–0.5w %, say 0.5w %.

The hydrocarbon oils which may be subjected to the wax cracking process of this invention may include oils which have heretofore been subjected to dewaxing or wax cracking processes. These oils include products, useful (after treatment) in lubricating oil compositions, commonly identified as wax distillate fractions, gas oils, etc.

Such charge oils are particularly characterized by their undesirably high content of waxy paraffinic components and by their high pour point. By practice of the process of this invention, it is possible to lower the pour point from 30° F. or higher and commonly 50° F.–100° F. down to a desirably lower point, typically to below 0° F. and commonly down to minus 10° F. to minus 40° F., say minus 20° F. to minus 30° F.

Prior to use of the catalyst composition, it is preferred to precondition the composition by heating, in a flowing stream of hydrogen, to 300° F.–1000° F., preferably 300° F.–400° F., say 300° F. for 10–24 hours, preferably 15–24 hours, say 15 hours—followed by maintaining at 700° F.–800° F., preferably 750° F.–780° F., say 780° F. to 1–6 hours, preferably 3–5 hours, say 3 hours.

Catalytic dewaxing in accordance with the process of this invention may be carried out at anhydrous conditions by passing the charge hydrocarbon in gas phase into contact with the preconditioned catalyst in the presence of hydrogen, at the following conditions:

TABLE

| Condition | Broad | Preferred | Typical |
|---|---|---|---|
| Temperature °F. | 450–1000 | 500–700 | 550 |
| Pressure psig | 0–3000 | 1000–2500 | 1000 |
| LHSV | 0.2–20 | 0.4–5 | 1 |
| Hydrogen rate SCFB | 1000–20,000 | 5000–15,000 | 10,000 |

The catalyst may be in the form of granules, e.g. 10 to 35 mesh Tyler Standard Screen Scale, and preferably is in the form of pellets or extrusions having a diameter of about 1/16 inch. The reaction is suitably carried out in a fixed bed of catalyst with the hydrogen and feedstock passing downwardly through the catalyst bed. Unreacted hydrogen may be separated from the effluent stream from the catalyst bed and recycled to the process.

Effluent from the catalytic dewaxing operation may be characterized by a substantially decreased content of wax as measured by the pour point. The pour point may be decreased by as much 130° F. and commonly 50° F.–80° F., say 60° F.

It is a particular feature of the process of this invention that use of the novel catalyst system permits attainment of the following advantages inter alia:

(i) it permits attainment of conversion of undesirable charge waxy paraffins at a level approaching 100% by use of a catalyst calcined preferably at 1300° F.–1500° F. after contact with water for the last time;

(ii) it permits attainment of desirable decrease in pour point of as much as 130° F. and commonly 50° F.–80° F.;

(iii) it permits operation under conditions such that the coke lay down on the catalyst will be as low as say 50% of that heretofore encountered; and (iv) it permits operation under conditions such that the catalyst life (between regenerations) may be 3000–5000 hours, say 4000 hours which is 33% longer than that of control catalysts operating outside the scope of this invention.

DESCRIPTION OF PREFERRED EMBODIMENT

Practice of this process of this invention may be apparent to those skilled in the art from inspection of the following wherein, as elsewhere in this application, all parts are parts by weight unless otherwise stated.

EXAMPLES I–XVI

In this series of Examples three different hydrogen mordenites are employed: viz: those having a weight ratio of silica-to alumina of 10:1, of 20:1, and of 60:1. Each mordenite sample is loaded with 2 w% palladium from an aqueous solution of palladium chloride and then dried at 212° F. for 24 hours. The loaded mordenite is then calcined at the temperature indicated in the following table for 15–19 hours. It is then preconditioned in hydrogen at a rate of 50 VHSV at 300° F./1 atm for 15–19 hours followed by a period of 2 hours at 780° F.

Catalytic dewaxing activity is measured by (and found to be correlative with) conversion of charge n-dodecane to non-waxy components. Reaction is carried out in vapor phase at 550° F., LHSV of 1, hydrogen flow of 50 VHSV at hydrogen pressure of 1 atmosphere. Each Example run is carried out for 5 hours; and the conversion of n-dodecane is measured.

| Example | Ratio | Calcination Temperature °F. | Conversion |
|---|---|---|---|
| I | 10:1 | uncalcined | 23 |
| II | 10:1 | 1000 | 6 |
| III | 10:1 | 1300 | 37 |
| IV | 10:1 | 1400 | 77 |
| V | 10:1 | 1600 | 0 |
| VI | 20:1 | uncalcined | 29 |
| VII | 20:1 | 1000 | 9 |
| VIII | 20:1 | 1200 | 11 |
| IX | 20:1 | 1200 | 25 |
| X | 20:1 | 1300 | 100 |
| XI | 20:1 | 1480 | 100 |
| XII | 20:1 | 1600 | 10 |
| XIII | 60:1 | uncalcined | 41 |
| XIV | 60:1 | 1000 | 16 |
| XV | 60:1 | 1300 | 48 |
| XVI | 60:1 | 1480 | 26 |

From this table, it is apparent that best results are attained using the 20:1 mordenite which has been calcined at 1300° F.–1500° F., these Examples giving 100% conversion. It is noted that catalyst which maintained high activity remained gray in color whereas catalysts calcined at lower temperatures, became black due to formation of coke.

EXAMPLE XVII 100 parts of Zeolon H brand of hydrogen mordenite (silica-to alumina ratio 20:1), on a dry basis, is slurried in 33 parts of water containing 5 w% palladium chloride. After twelve hours, the aqueous solution is withdrawn and replaced by the same amount of fresh solution which is permitted to remain in contact, with stirring, with the hydrogen mordenite for an additional twelve hours.

The mordenite is then filtered and washed with distilled water until it is chloride-free. It is then dried at 212° F. for 15 hours, and pelleted into 10–35 mesh pellets.

The 2 w % palladium-on-hydrogen mordenite so prepared is dried at 212° F. for 15 hours and thereafter heated to calcination temperature of 1300° F. for 15 hours. It is then preconditioned by heating in hydrogen (VHSV of 50) at 300° F./1 atm for 15–19 hours followed by a period of 2 hours at 780° F.

Catalytic dewaxing charge is a wax distillate which has been treated to lower its aromatic content and its nitrogen content. Dewaxing is carried out in vapor phase at the following conditions:

TABLE

| Temperature °F. | 550 |
|---|---|
| Pressure psig | 350–1300 |
| Hydrogen SCFB | 5000 |
| Space Velocity LHSV | 1 |

The product dewaxed oil has the properties noted:

TABLE

| Property | Product | Charge |
|---|---|---|
| Pour Point °F. | −30 | 50 |
| Viscosity SUS/100° F. | 72 | 60 |

From the above table, it is apparent that it is possible to lower the pour point by 80° F. without appreciably changing the viscosity.

After 3000 hours of operation, the pour point of the product is found to be 0° F.; and the catalyst is regenerated at 1000° F. for 24 hours in flowing hydrogen of increasing oxygen content (1 VHSV). The regenerated catalyst is found to be as effective as the fresh catalyst measured in terms of the pour point of the dewaxed product.

Although this invention has been illustrated by reference to specific embodiments, it will be apparent to those skilled in the art that various changes and modifications may be made which clearly fall within the scope of this invention.

I claim:

1. The method which comprises
    loading a hydrogen mordenite having a silica-to-alumina mole ratio of 10–50:1, with a metal of the platinum-palladium group thereby forming a loaded hydrogen mordenite;
    calcining said loaded hydrogen mordenite at 1300° F.–1500° F., after the catalyst has been exposed to water for the last time, thereby forming a calcined loaded hydrogen mordenite containing activated sites; and
    recovering said calcined loaded hydrogen mordenite containing activated sites.

2. The method of claim 1 wherein said hydrogen mordenite is calcined prior to and after said loading step.

3. The method of claim 1 wherein said mole ratio is 10–20:1.

4. The method of claim 1 wherein said metal is palladium.

5. The method of claim 1 wherein said metal is palladium in amount of 0.5 w %–2.5 w %.

6. The method which comprises loading a hydrogen mordenite having a silica-to-alumina mole ratio of 10–20:1, with 0.5 w %–2.5 w % palladium thereby forming a palladium-on-hydrogen mordenite;
    calcining said loaded palladium-on-hydrogen mordenite at 1300° F.–1500° F., after the catalyst has been exposed to water for the last time, thereby forming a calcined palladium-on-hydrogen mordenite containing activated sites; and;
    recovering said calcined palladium-on-hydrogen mordenite containing activated sites.

7. The method which comprises
    calcining a hydrogen mordenite having a silica-to-alumina mole ratio of 10–20:1 at 1200° F.–1600° F. thereby forming calcined hydrogen mordenite containing activated sites;
    loading said hydrogen mordenite having a silica-to-alumina mole ratio of 10–20:1, with a metal of the platinum-palladium group thereby forming a loaded hydrogen mordenite;
    calcining said loaded hydrogen mordenite at 1300° F.–1500° F., after the catalyst has been exposed to water for the last time, thereby forming calcined hydrogen mordenite containing activated sites; and
    recovering said calcined hydrogen mordenite containing activated sites.

8. The method which comprises calcining a hydrogen mordenite having a silica-to-alumina mole ratio of 10–50:1 at 1300° F.–1500° F., after the catalyst has been exposed to water for the last time, thereby forming a calcined hydrogen mordenite containing activated sites; and
    recovering said calcined hydrogen mordenite containing activated sites.

9. The method of claim 8 wherein the hydrogen mordenite catalyst is in the $NH_4^+$ form.

10. A calcined hydrogen mordenite, having a silica-to-alumina ratio of 10–50:1 prepared by the process which comprises
    calcining a hydrogen mordenite having a silica-to-alumina mole ratio of 10–50:1, at 1300° F.–1500° F., after the catalyst has been exposed to water for the last time, thereby forming a calcined hydrogen mordenite containing activated sites; and
    recovering said calcined hydrogen mordenite containing activated sites.

11. A calcined hydrogen mordenite catalyst, having a silica-to alumina ratio of 10–50:1 and bearing a metal of the platinum-palladium group, prepared by the process which comprises
    calcining said hydrogen mordenite at 1300° F.–1500° F., after the catalyst has been exposed to water for the last time, thereby forming a calcined hydrogen mordenite containing activated sites; and
    recovering said calcined hydrogen mordenite containing activated sites.

* * * * *